United States Patent
McGee

(10) Patent No.: US 6,793,187 B2
(45) Date of Patent: Sep. 21, 2004

(54) MOVABLE MOUNTING BRACKET ARM ASSEMBLY

(76) Inventor: Harry L. McGee, 304 Commons Way, Goose Creek, SC (US) 29445

( * ) Notice: Subject to any disclaimer, the term of this patent is extended or adjusted under 35 U.S.C. 154(b) by 47 days.

(21) Appl. No.: 10/306,261

(22) Filed: Nov. 27, 2002

(65) Prior Publication Data
US 2004/0099780 A1 May 27, 2004

(51) Int. Cl.$^7$ .................................................. A47F 5/00
(52) U.S. Cl. ................................................. 248/289.11
(58) Field of Search ........................ 248/289.11, 290.1, 248/282.1, 274.1, 296.1, 297.21

(56) References Cited

U.S. PATENT DOCUMENTS

| 4,003,536 | A | * | 1/1977 | Sekerich ..................... 248/585 |
| 4,185,801 | A | * | 1/1980 | Plymoth ................... 248/282.1 |
| 4,225,106 | A | * | 9/1980 | Eplan ....................... 248/282.1 |
| 4,651,966 | A | * | 3/1987 | Suzuki ........................ 248/674 |
| 4,793,582 | A | | 12/1988 | Bronstein et al. |
| 5,408,756 | A | | 4/1995 | Wahls |
| 5,497,715 | A | | 3/1996 | Meek et al. |
| 5,542,190 | A | | 8/1996 | Wahls |
| 5,687,448 | A | | 11/1997 | Dye, Jr. |
| 5,860,554 | A | | 1/1999 | Ruffo |
| 6,129,321 | A | | 10/2000 | Minelli et al. |
| 6,173,933 | B1 | | 1/2001 | Whiteside et al. |
| 6,201,690 | B1 | | 3/2001 | Moore et al. |
| 2001/0009322 | A1 | * | 7/2001 | Tsai |
| 2002/0020797 | A1 | * | 2/2002 | Artz |

* cited by examiner

Primary Examiner—Ramon O. Ramirez
(74) Attorney, Agent, or Firm—Kathleen M. Harleston; Harleston Law Firm LLC

(57) ABSTRACT

A movable mounting bracket arm assembly for use in a monitoring well or the like includes:

(a) mounting bracket attachable to a wall of a well;

(b) a movable mounting bracket arm including a posterior segment attachable at one end to the mounting bracket, and a breakaway anterior segment removably attachable to an opposite end of the posterior segment, the anterior segment being pivotally coupled to the posterior segment; and (c) a means of suspending at least one monitoring or sampling device in a downward direction from the anterior segment.

19 Claims, 6 Drawing Sheets

MOVABLE MOUNTING BRACKET ARM ASSEMBLY

BACKGROUND OF THE INVENTION

1. Technical Field

The present invention relates to a movable mounting bracket arm for use in a ground well, concrete tank, or the like.

2. Background Information

Currently, a sturdy arm with a mounting bracket at one end is affixed to a wall of water or wastewater wells or tanks for holding sensitive equipment out over the surface of the water or wastewater in the well or tank. The existing arm is generally horizontal and parallel to the water surface and extends out over the center of the well or tank. An ultrasonic sensor, for example, can be dangled from the free end of the existing arm over the water surface so that the changing water level in the well can be automatically measured. Unfortunately, the currently used arm and the sensitive equipment mounted on it must be removed by unfastening the mounting bracket if any work is to be done in the well. Removal is awkward, since the worker must lean down into the well from ground level, and the sensitive equipment can be damaged during removal and reinstallation.

There is currently a need for a commercially available mounting bracket arm that can be moved out of the way of machinery going into the well. The two-way mounting bracket arm of the present invention, as well as any sensitive equipment mounted to it, can be moved adjacent to the well wall, where it is out of the way of work being done in the well. When the work has been completed, the present mounting bracket arm can be grasped and pulled back into its extended position. This saves time previously spent unscrewing the bracket, and decreases the likelihood of damage to the sensitive equipment, or the arm, from repeated installation and removal from the well. It also avoids the need for readjusting and recalibrating the sensitive equipment once the arm has been reinstalled in the well.

The movable hinged mounting bracket arm of the present invention is coupled to a mounting bracket at its distal end. The mounting bracket is mountable on a generally vertical wall of a water well. The bracket arm of the present invention is usable for mounting sensitive electronic, laboratory, or similar type equipment, such as an ultrasonic sensor, float, or pH probe.

When work is to be done in a well, or if the worker simply needs an unimpaired view down the well, the bracket arm of the present invention can be "broken" and pushed either to the far left or the far right to a bent, "resting" position adjacent to the well wall, where the arm and equipment are out of the way. When work has been completed, the worker can easily reset the bracket in its original, extended position. Another advantage of the present invention is that the free end of the bracket arm is movable in a semicircular arc, which allows repositioning of sensitive equipment, such as a pH meter, to alternate positions in addition to its position at the center of the well.

BRIEF SUMMARY OF THE INVENTION

The present invention is a movable mounting bracket arm assembly for use in a well or tank, including:

(a) a mounting bracket attachable to a wall of a well or tank;

(b) a movable mounting bracket arm comprised of a posterior segment attachable at one end to the mounting bracket, and a breakaway anterior segment removably attachable to an opposite end of the posterior segment, the anterior segment being pivotally coupled to the posterior segment; and (c) a means of suspending at least one monitoring or sampling device in a downward direction from the anterior segment.

BRIEF DESCRIPTION OF THE SEVERAL VIEWS OF THE DRAWINGS

A more complete understanding of the invention and its advantages will be apparent from the following detailed description taken in conjunction with the accompanying drawings, wherein examples of the invention are shown, and wherein.

DETAILED DESCRIPTION OF THE INVENTION

Figure 1:
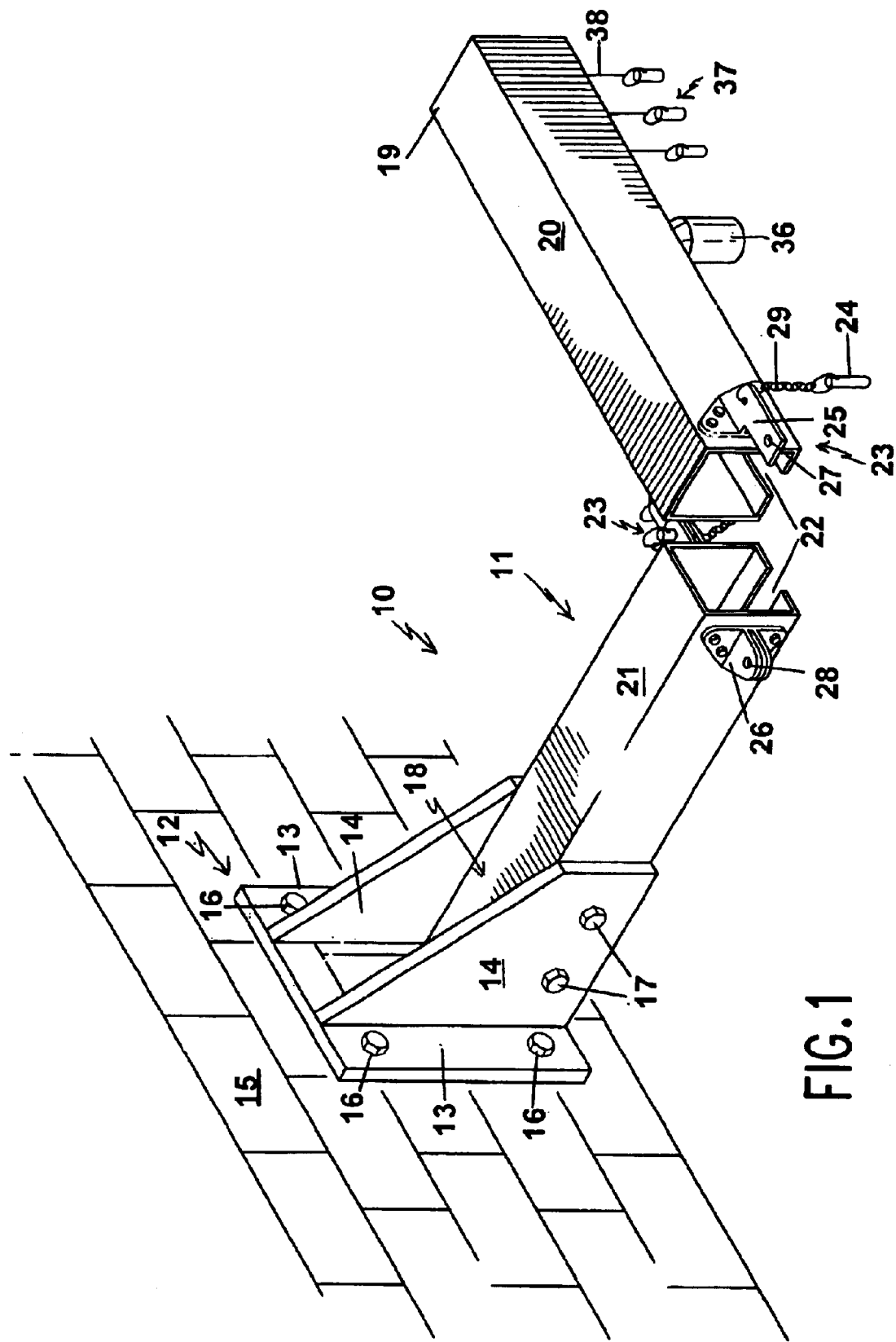
FIG. 1 is a perspective view of a mounting bracket arm assembly according to the present invention, showing the arm in a broken position.

In the following description, like reference characters designate like or corresponding parts throughout the several views. Also, in the following description, it is to be understood that such terms as "top," "bottom," and the like are words of convenience and are not to be construed as limiting terms. Referring in more detail to the drawings, the invention will now be described.

Turning first to FIG. 1, a mounting bracket arm assembly, generally referred to as 10, comprises a movable mounting bracket arm 11, coupled to a rigid mounting bracket 12. The mounting bracket 12 includes a generally planar mounting plate 13 with two matching, generally planar bracket side members 14 mounted at one end to the mounting plate 13. The mounting plate 13 is mounted to a wall 15 of a tank or wet well, such as an in-ground well associated with a utility or a municipal water or wastewater treatment facility, by a wall mounting means, preferably wall mounting screws 16. The bracket side members 14 extend in a generally perpendicular direction from the mounting plate 13, as does the bracket arm mounted between the bracket side members by any suitable arm mounting means, preferably screws 17. The arm mounting screws 17 are fastened through a bottom portion of each bracket side member 14 into an end portion 18 of the mounting bracket arm 11. The opposite, free end 19 of the bracket arm 11, which is preferably made of stainless steel, extends out over the well or tank.

Continuing with FIG. 1, the generally elongated mounting bracket arm 11 is comprised of two segments, an anterior, breakaway segment 20 with the free end 19 of the arm, and a posterior segment 21 ending at the mounting bracket 12. The anterior, breakaway segment 20 is removably attached to the posterior segment 21, which is stationary in the embodiment depicted in FIG. 1. The anterior, breakaway segment is pivotable about an approximately 90 degree angle.

The lower side of the bracket arm 11 may include a channel 22, as shown in FIG. 1. Alternatively, a circular pipe, preferably made of polyvinyl chloride, or a V-angle arm (with the apex of the "V" pointing in an upward direction) may be utilized for the bracket arm instead of a rectangular-shaped bracket arm. A wire leading to an electronic device, such as an ultrasonic sensor 36, may extend along the bracket arm.

Figure 2:
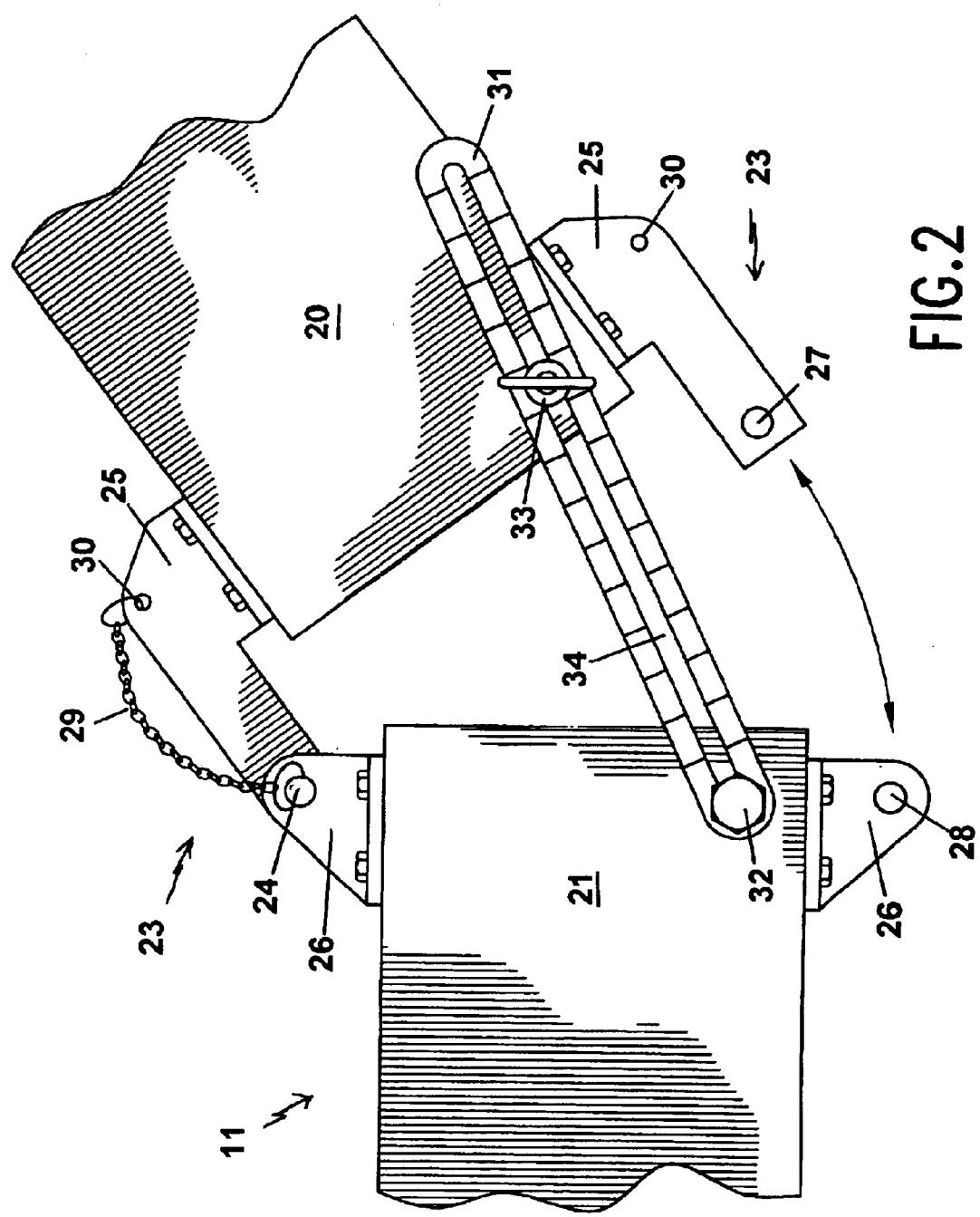
FIG. 2 is a side elevational view of a central portion of the movable bracket arm according to FIG. 1.

Referring to FIGS. 1 and 2, the anterior, breakaway segment 20 is removably attached to the posterior segment 21 by means of one or two hinges 23 mounted on opposite sides of the bracket arm 11. The anterior segment 20 is movably affixed to the posterior segment 21 by at least one hinge, the hinge comprising at least two hinge members 25, 26. One of the hinge members 26 is affixed to an anterior end of the posterior segment 21. The other one of the two hinge members 25 is affixed to a posterior end of the anterior segment 20.

In FIG. 1, a two-sided hinge 23, which is preferably made of stainless steel or forged brass, includes two removable pins 24. The hinge 23 include a male hinge member 25 and an interlocking female hinge member 26, each with a corresponding aperture 27, 28, respectively, through which one of the pins 24 is insertable. In FIG. 1, the male hinge member 25 is mounted on an end side of the anterior segment 20, and the female hinge member 26 is mounted on a corresponding end side of the posterior segment 21. Each removable pin 24 is preferably attached to one end of a short chain 29, the other end of which is affixed to the male hinge member 25 through chain aperture 30, to prevent loss of the pin down the well. When the hinge 23 is pinned closed, it holds the bracket arm 11 in one piece. In FIGS. 1 and 2, the bracket arm 11 is shown in a broken (open) position, with one hinge 23 closed and one open. A well-built, reliable hinge will hold the bracket arm level over time, which is important in obtaining reliable readings from certain equipment hung on the free end of the bracket arm.

As depicted in FIG. 2, the bracket arm assembly may include an adjustable slide bracket 31 in order to allow the broken bracket arm 11 to remain open at a certain, controlled angle. One end of the slide bracket 31 is pivotably affixed to an upper end of the posterior segment 21 by a bolt 32. A wing nut 33 in the slide channel 34 at an opposite end of the slide bracket 31 on the end of the top side of the anterior segment 20 is tightenable when the desired angle of the arm segments 20, 21 is reached. When the wing nut 33 is tightened, the bracket arm 11 is held open at the desired angle. In this fashion, the bracket arm 11 can be fixed over the well or tank at various locations. The bracket arm 11 can be moved again simply by untightening the wing nut 33 and repositioning the anterior arm segment 20. With certain sensitive equipment and measurements, a quantifiable, reliable angle can improve the accuracy of readings from the equipment.

Figure 3:
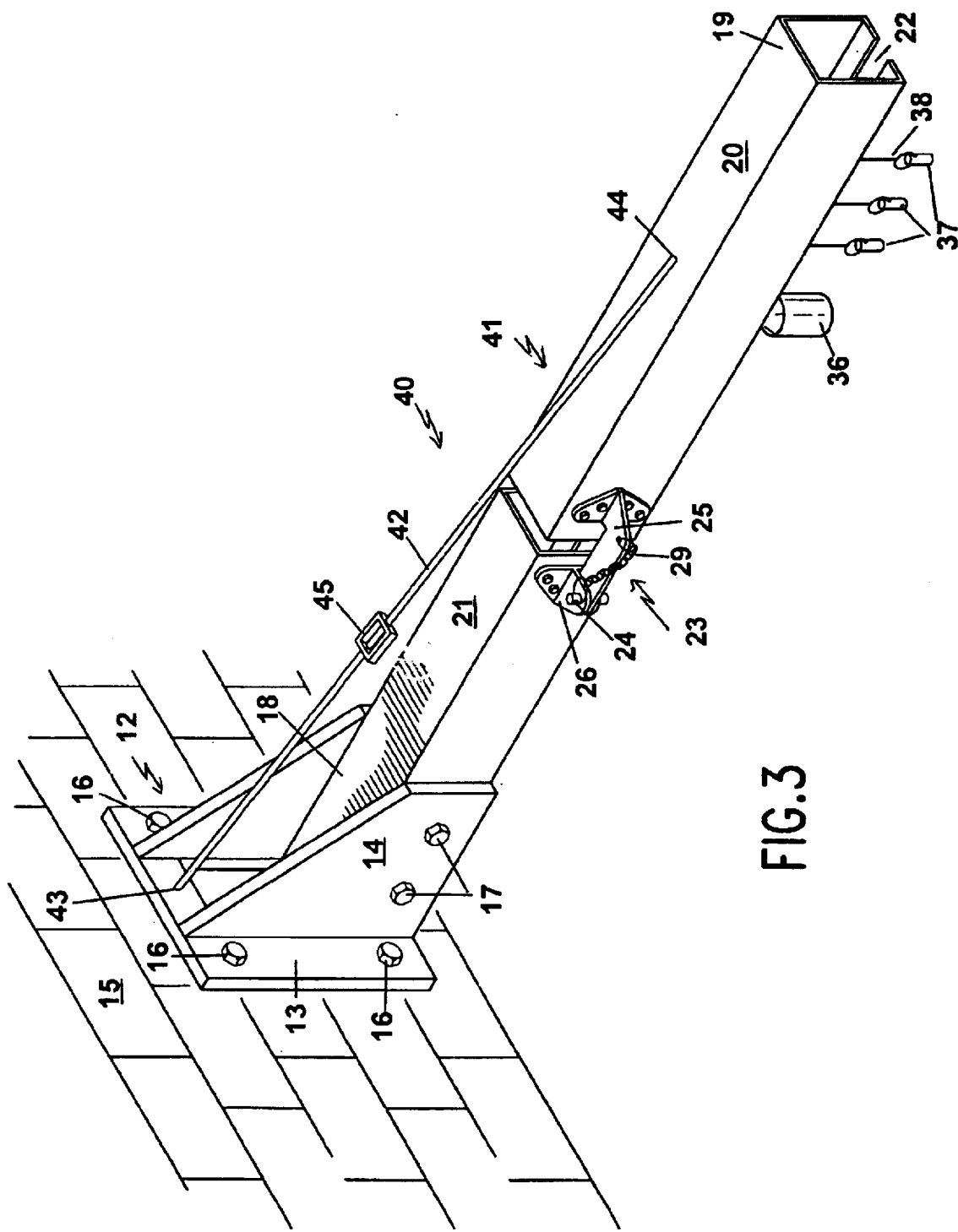
FIG. 3 is a perspective view of a mounting bracket arm assembly according to the present invention, showing the bracket arm in an extended position.

As shown in FIGS. 1 and 3, an ultrasonic sensor device 36 and a number of sampling vials 37 may be suspended over the well or tank from the bracket arm channel 22. Other types of electronic, chemical, or mechanical sensors and monitoring or sampling devices, such as floats, pH probes, and flow data gatherers, may be suspended from the anterior segment of the bracket arm in addition to, or instead of, the monitoring/sampling devices 36, 37 shown. Any suitable means of suspending the device over the tank or well water may be employed. In FIGS. 1 and 3, each monitoring/sampling device 36, 37 is attached to one end of a cord 38 or the like and suspended over the well from the anterior segment 20 of the bracket arm 11. The suspension cord 38 is of an appropriate length so as to suspend the monitoring/sampling device 36, 37 at the desired height above the water level, or into the water, as desired.

With continued attention to FIG. 3, an alternate embodiment 40 of a bracket arm assembly includes an elongate bracket arm 41 ready for use in a straight, extended position. This embodiment 40 of the bracket arm assembly further includes an extendable cable or rod 42 for further supporting the bracket arm 41. This embodiment can accommodate an elongate bracket arm 41 and/or heavier monitoring/sampling devices on its anterior segment 20. One end 43 of the cable or rod 42 is affixed to an upper portion of the bracket mounting plate 13, and an opposite end 44 of the rod 42 is affixed to a central, upper side of the anterior segment 20. A rod adjustment means, such as a turnbuckle 45, on the rod for tensioning the rod allows a user to increase or decrease tension on the anterior segment 20.

Figure 4:
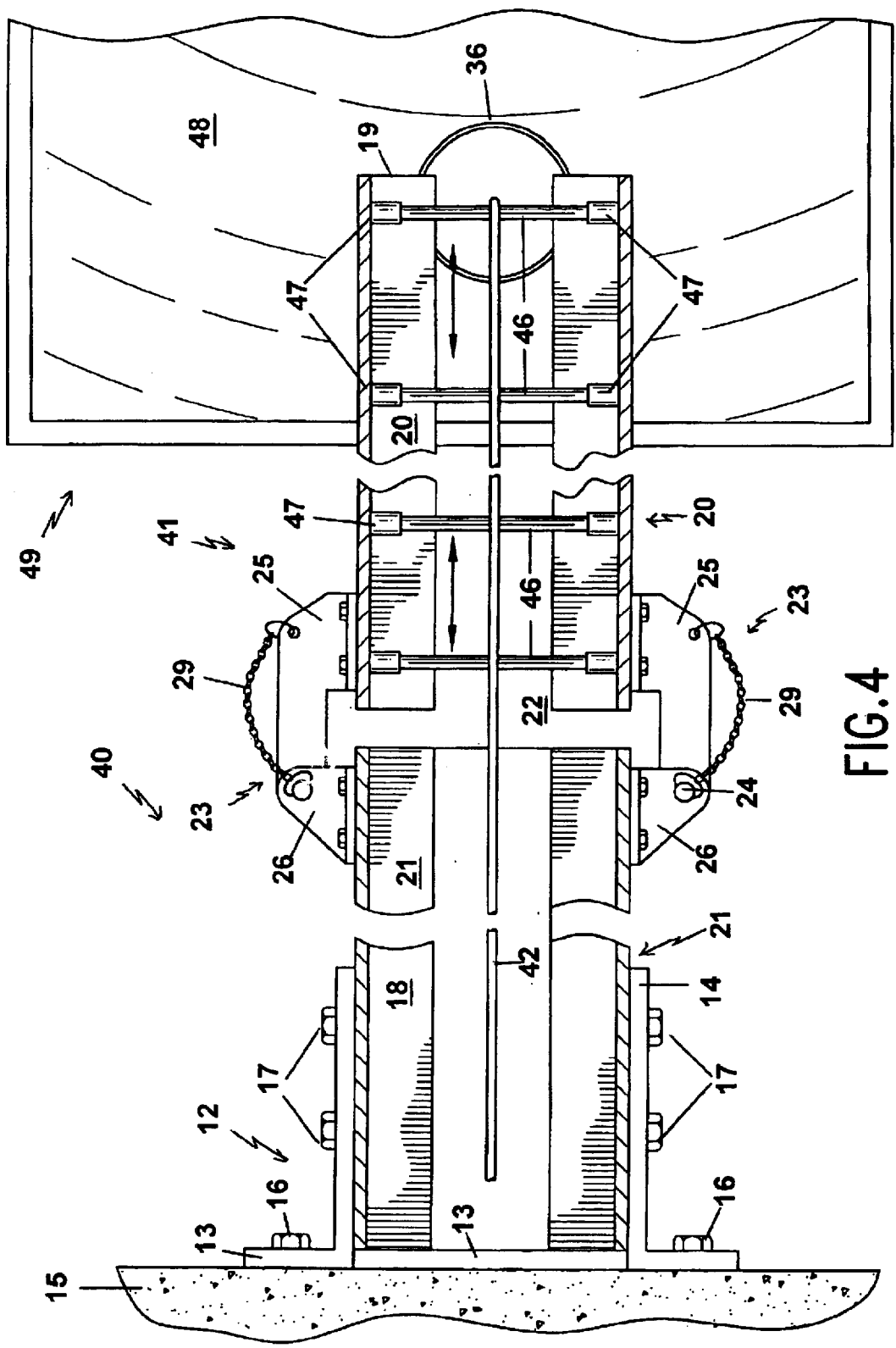
FIG. 4 is a cross-sectional top plan view of a portion of a mounting bracket arm assembly according to the present invention.

Turning now to FIG. 4, a cross-section of the bracket arm assembly 40 shows the inside of the bracket arm 41. In this view, the rod 42 on top of the arm 41 is visible along the midline of the arm. The mounting bracket 12 is shown attached via bolts or screws 16 to a wall 15 of the well or tank. The posterior arm 21 is bolted to the side members 14 of the mounting bracket 12 via bolts or screws 17. The anterior arm 20 is attached to the posterior arm 21 by hinges 23 on opposite sides of the arm, which are shown in a closed position in FIG. 4.

Continuing with FIG. 4, for each monitoring/sampling device 36, 37, an opposite end of each suspension cord 38 is attached around a center of a pin 46, which slides into the arm channel 22 from the open end 19 of the bracket arm 41 (see two-headed directional arrow). The ends 47 of the horizontally oriented channel pin 46 extend across the arm channel 22 and rest on opposite sides of the inside of the bracket arm 41. The channel pin 46 suspends the monitoring or other type of device 36 on its suspension cord over the water 48 in a tank or well 49. Four channel pins 46 are shown in FIG. 4, though any practical number of monitoring/sampling devices may be suspended along the bracket arm 41. Since the channel pins are easy to slide right or left along the channel 22, they facilitate moving and repositioning the monitoring/sampling devices 36, 37. With the channel pins 46, it is easy to change the order of the monitoring/sampling devices 36, 37. The bracket arm assembly may include a roller mechanism mounted to the bracket arm for rolling a sensor or sampling container down to the tank or well water and up again to the bracket arm.

Figure 5:
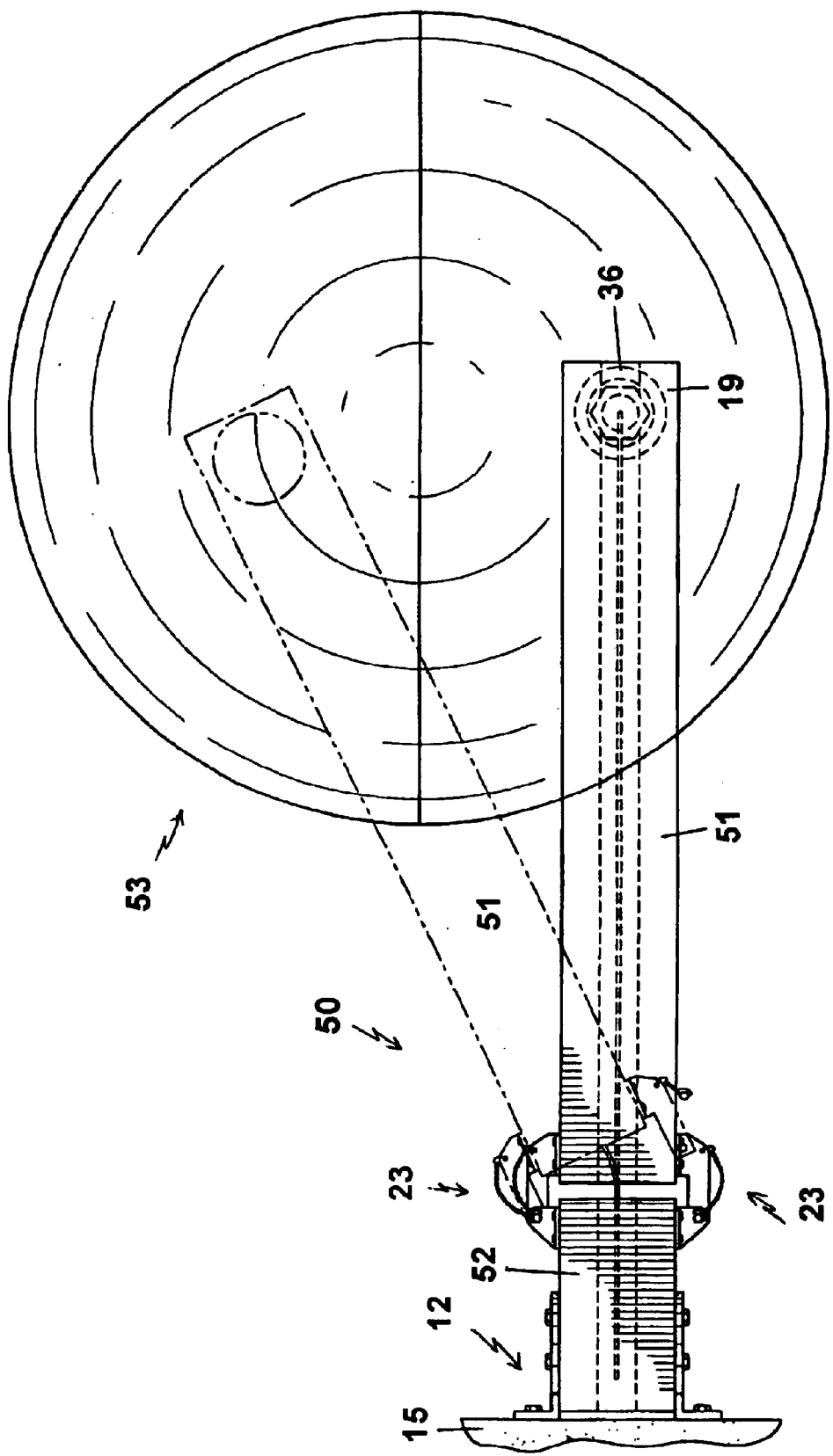
FIG. 5 is a top plan view of a mounting bracket arm assembly according to the present invention, showing alternate bracket arm positions.

FIG. 5 illustrates in phantom an alternate, angled position of the anterior segment 51. In this embodiment 50 of a bracket arm assembly, the anterior segment 51 is substantially longer than the posterior segment 52, which would be useful for certain well configurations. Most conventional wells are generally circular 53 in shape, as shown in FIG. 5, square-shaped, as shown in FIG. 4, or rectangular in shape. The bracket arm assembly 50 includes a monitoring device 36 suspended over the well water from the free end 19 of the anterior segment 51.

In use, a user, such as a water company employee, can unclasp one of the hinge pins 24, and swing the anterior segment to the right or left. Since the pin hinge 23 is two-sided, the anterior segment 20, 51 can be rotated in either direction, as needed. For example, the right side hinge pin 24 can be pulled and the anterior segment 20, 51 can be rotated in a 90 arc to the left. Alternatively, the left side hinge pin 24 can be pulled and the anterior segment 20, 51 can be rotated in a 90 arc to the right. All together, this allows an arm swing of about 180 degrees. If desired, the anterior segment 20, 51 can be moved to a position where it is at a right angle to the posterior segment 21, 52, in which case the bracket arm is for the most part out of the way of work going on in the well 49, 53. In FIG. 5, the anterior segment 51 is shown in a straight, unbroken position, and in phantom at an angle of about 30 degrees from the straight position.

Alternatively, the hinges 23 may be mounted so that the anterior segment 20 can be moved up or down, rather than side to side, at a desired angle. Also, a mounting bracket arm assembly 10 herein may include several removable, telescoping or snap-together anterior segments 20 for lengthening an arm, as desired. Such an embodiment accommodates wider or narrower wells, allowing an ultrasonic sensor, for example, to be suspended directly over the middle of the well water for more accurate water level assessment. The present invention includes a kit comprising a mounting bracket 12, a posterior segment 21 with single or double hinges 23, and two alternate anterior segments 20, one short for narrower wells/tanks and one long for wider wells.

If desired, both hinges 23 may be unpinned and the anterior segment 20, 51 may be removed from inside the well. This feature makes it easier to work on the well or the anterior segment, change the relative positions of the monitoring/sampling devices 36, 37, or slide them up or down the arm channel 22, and then replace the bracket arm 11, 41 in the mounted bracket 12.

Figure 6:
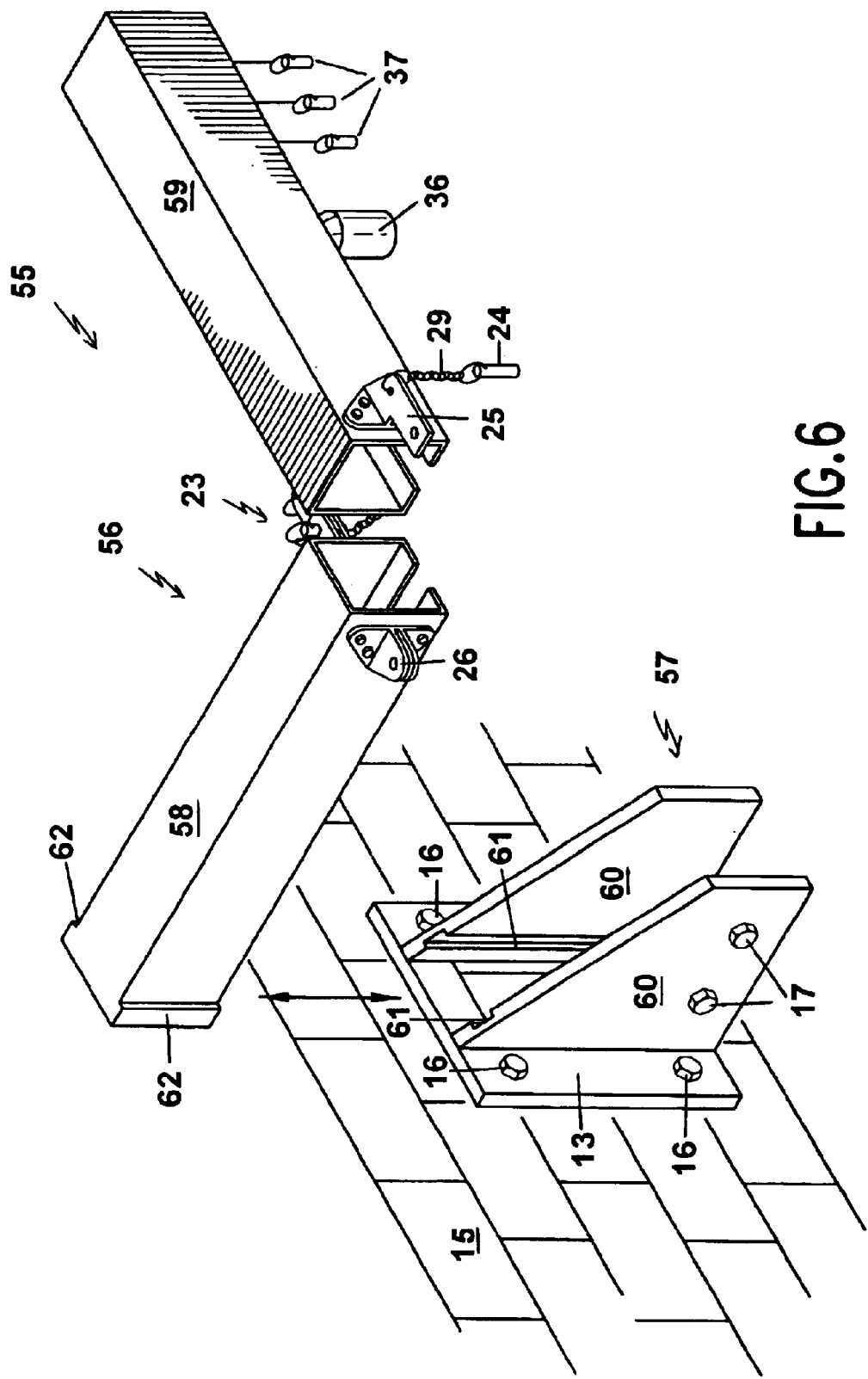
FIG. 6 is a perspective view of an alternate embodiment of a mounting bracket arm assembly according to the present invention, showing the bracket arm in a broken position and removed from its mounting bracket.

Referring to FIG. 6, an alternate, preferred embodiment 55 of the mounting bracket arm assembly herein comprises a bracket arm 56 as described herein, as well as a slotted mounting bracket 57 to which a posterior end of the posterior segment 58 is removably coupleable. An anterior segment 59 is hingedly attached to the removable posterior segment 58 by a two-sided pin hinge 23. The rigid mounting bracket 57 includes a generally planar mounting plate 13 with two matching, generally planar bracket side members 60 attached at one end to the mounting plate 13. The matching bracket side members 60 include a means of removably supporting the mounting. bracket arm, preferably two matching, generally vertically oriented slots 61. The posterior end of the posterior segment 58 includes two matching projections 62 on its opposite sides. The generally vertically oriented projections 62 correspond to the mounting bracket slots 61. Each of the mounting bracket slots 61 includes a stop at the bottom of each slot, so that the bracket arm 56 does not slide out from the bottom of the mounting bracket.

This convenient feature allows a user to remove the entire bracket arm 56 from the well in order to work on it, or to work in the well unimpeded, for example. Work is easier, since it does not entail leaning over into a well, and less dangerous, and work quality is improved.

With the present invention, more and better samples and measurements can be taken, because the bracket arm and its hanging monitoring/sampling devices can be moved to various desired positions. Expensive and/or sensitive sampling or monitoring equipment, such as ultrasonic sensors, are less likely to malfunction or be broken, and are easier to retrieve for trouble shooting. A user choosing a location on a well wall for mounting a bracket arm need not make removal of primary importance. The arm assembly of the present invention is versatile and inexpensive to manufacture, and it relieves worker frustration and requirements for highly skilled workers.

From the foregoing it can be realized that the described device of the present invention may be easily and conveniently utilized as a removable bracket arm assembly for use in a well. It is to be understood that any dimensions given herein are illustrative, and are not meant to be limiting.

While preferred embodiments of the invention have been described using specific terms, this description is for illustrative purposes only. It will be apparent to those of ordinary skill in the art that various modifications, substitutions, omissions, and changes may be made without departing from the spirit or scope of the invention, and that such are intended to be within the scope of the present invention as defined by the following claims. It is intended that the doctrine of equivalents be relied upon to determine the fair scope of these claims in connection with any other person's product which fall outside the literal wording of these claims, but which in reality do not materially depart from this invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

BRIEF LIST OF REFERENCE NUMBERS USED IN THE DRAWINGS 10 mounting bracket arm assembly
11 movable mounting bracket arm
12 mounting bracket
13 mounting plate
14 bracket side members
15 wall of well
16 wall mounting screws
17 arm mounting screws
18 end portion of mounting bracket arm
19 free end portion of mounting bracket arm
20 anterior, breakaway segment
21 posterior segment
22 arm channel
23 hinge
24 hinge pin
25 male hinge portion
26 female hinge portion
27 aperture in male hinge portion
28 aperture in female hinge portion
29 pin chain
30 pin chain aperture
31 slide bracket
32 slide bolt
33 slide wing nut
34 slide channel
36 ultrasonic sensor
37 sampling vial
38 suspension cord
40 bracket arm assembly-2nd embodiment
41 elongate bracket arm
42 arm rod
43 bracket end of rod
44 arm end of rod
45 slidable rod adjustment means 46 channel pin
47 ends of channel pin
48 well water
49 square-shaped well
50 bracket arm assembly-3rd embodiment
51 long anterior segment
52 short posterior segment
53 circular-shaped well
55 bracket arm assembly-4th embodiment
56 removable bracket arm
57 slotted mounting bracket
58 removable posterior segment
59 anterior segment-4th embodiment
60 slotted bracket side members
61 slots
62 projections

What is claimed is:

1. A mounting bracket arm assembly for use in a well, the assembly comprising:
   (a) a mounting bracket attachable to a wall of a well;
   (b) a movable mounting bracket arm comprised of a posterior segment attachable at one end to the mounting bracket, and a breakaway anterior segment removably attachable to an opposite end of the posterior segment, the anterior segment being pivotally coupled to the posterior segment; and
   (c) a means of suspending at least one monitoring or sampling device in a downward direction from the anterior segment;
   wherein the anterior segment is movably affixed to the posterior segment by at least one hinge, the hinge comprising at least two hinge members, one of the at least two hinge members being affixed to an anterior end of the posterior segment, and the other of the at least two hinge members being affixed to a posterior end of the anterior segment.

2. A mounting bracket arm assembly according to claim 1, wherein the mounting bracket comprises a generally planar mounting plate with two matching, generally planar bracket side members, each side member being mounted at one end to the mounting plate.

3. A mounting bracket arm assembly according to claim 2, wherein the bracket side members extend in a generally perpendicular direction from the mounting plate, the posterior segment of the bracket arm is mounted between the bracket side members, and a free end of the anterior segment of the bracket arm extends outwardly over the well.

4. A mounting bracket arm assembly according to claim 2, further comprising an extendible rod affixed at one of its ends to a mounting plate of a bracket, and at an opposite one of its ends to an anterior segment of the bracket arm, and a rod adjustment means on the rod for tensioning the rod.

5. A mounting bracket arm assembly according to claim 1, wherein the posterior segment is stationary, and the anterior, breakaway segment is pivotable about an approximately 90 degree angle.

6. A mounting bracket arm assembly according to claim 1, further comprising a two-sided pin hinge having two matching sides, each side comprising a removable pin.

7. A mounting bracket arm assembly according to claim 6, wherein each side of the pin hinge comprises a male hinge member and an interlocking female hinge member, each male and female hinge member comprising a corresponding aperture through which one of the two pins is insertable.

8. A mounting bracket arm assembly according to claim 7, wherein each removable pin is attached to one end of a chain, the other end of the chain being affixed to the male hinge member through a chain aperture in the male hinge member.

9. A mounting bracket arm assembly according to claim 7, further comprising a slide bracket for fastening the anterior segment in a broken position, one end of the slide bracket being pivotably affixed to an anterior end of the posterior segment by a first movable means of attachment.

10. A mounting bracket arm assembly according to claim 9, wherein an opposite end of the slide bracket is movably affixed to a posterior end of the anterior segment by a second movable means of attachment.

11. A mounting bracket arm assembly according to claim 10, wherein the first movable means of attachment is a bolt and the second movable means of attachment is a tightenable wing nut in a channel of the slide bracket; and wherein, when the wing nut is tightened, the bracket arm is held open at the pre-determined angle.

12. A mounting bracket arm assembly according to claim 7, further comprising a monitoring or sampling device suspended in a downward direction from the anterior segment.

13. A mounting bracket arm assembly according to claim 12, wherein a lower side of the bracket arm comprises a channel, and the means of attaching the monitoring or sampling device is a cord.

14. A mounting bracket arm assembly according to claim 13, wherein one end of the cord is attached to the monitoring or sampling device, and an opposite end of the cord is affixed to a horizontally oriented channel pin, the channel pin being braced across the arm channel.

15. A mounting bracket arm assembly according to claim 14, further comprising a roller mechanism mounted to the bracket arm.

16. A mounting bracket arm assembly for use in a well, the assembly comprising:
   (a) a mounting bracket attachable to a wall of a well;
   (b) a movable mounting bracket arm comprised of a posterior segment attachable at one end to the mounting bracket, and a breakaway anterior segment removably attachable to an opposite end of the posterior segment, the anterior segment being pivotally coupled to the posterior segment; and
   (c) a means of suspending at least one monitoring or sampling device in a downward direction from the anterior segment; and further comprising generally vertically oriented slots in the side members of the mounting bracket, and corresponding generally vertically oriented projections on opposite sides of a posterior end portion of the posterior segment; wherein the posterior segment is removably attachable to the mounting bracket.

17. A mounting bracket arm assembly according to claim 16, wherein each of the slots comprises a stop at a bottom end of each slot.

18. A mounting bracket arm assembly according to claim 16, wherein the mounting bracket comprises a generally planar mounting plate with two matching, generally planar bracket side members, each side member being mounted at one end to the mounting plate; and wherein the bracket side members extend in a generally perpendicular direction from the mounting plate, the posterior segment of the bracket arm is mounted between the bracket side members, and a free end of the anterior segment of the bracket arm extends outwardly over the well.

19. A mounting bracket arm assembly according to claim 18, wherein the anterior segment is movably affixed to the posterior segment by at least one hinge, the hinge comprising at least two hinge members, one of the at least two hinge members being affixed to an anterior end of the posterior segment, and the other of the at least two hinge members being affixed to a posterior end of the anterior segment.

* * * * *